United States Patent [19]

Hirayama et al.

[11] Patent Number: 5,645,457

[45] Date of Patent: Jul. 8, 1997

[54] SCREW TIGHTENING STRUCTURE

[75] Inventors: Yasuo Hirayama, Toyota; Hidetoshi Sato, Gotenba; Keiji Ushiyama, Gotenba; Koji Miyakoshi, Gotenba, all of Japan

[73] Assignee: Yazaki Corporation, Tokyo, Japan

[21] Appl. No.: 712,194

[22] Filed: Sep. 11, 1996

Related U.S. Application Data

[63] Continuation of Ser. No. 504,591, Jul. 20, 1995.

[30] Foreign Application Priority Data

Jul. 22, 1994 [JP] Japan .................................. 6-170790

[51] Int. Cl.⁶ ....................................................... H01R 4/30
[52] U.S. Cl. ................................................ 439/801; 439/949
[58] Field of Search ................................... 439/801, 808, 439/813, 778, 779

[56] References Cited

U.S. PATENT DOCUMENTS

| | | | |
|---|---|---|---|
| 2,731,616 | 1/1956 | Pavelka | 439/778 |
| 4,744,765 | 5/1988 | DeLeo | 439/801 |
| 4,857,021 | 8/1989 | Boliver et al. | 439/801 |
| 5,021,013 | 6/1991 | Wiesler | 439/801 |
| 5,088,940 | 2/1992 | Saito . | |
| 5,413,500 | 5/1995 | Tanaka | 439/801 |
| 5,442,133 | 8/1995 | Arnold et al. | 439/801 |

FOREIGN PATENT DOCUMENTS

| | | | |
|---|---|---|---|
| 0141885 | 5/1980 | Germany | 439/801 |
| 4-29165 | 3/1992 | Japan . | |
| 1204995 | 9/1970 | United Kingdom | 439/801 |

*Primary Examiner*—Neil Abrams
*Assistant Examiner*—T. C. Patel
*Attorney, Agent, or Firm*—Armstrong, Westerman Hattori, McLeland & Naughton

[57] ABSTRACT

A screw tightening structure for a switch box wherein an embedded nut is provided for the switch box, there is a bilateral bolt providing screw portions for both sides thereof, one side of screw portions of a bilateral bolt is screwed to the embedded nut, a bus bar and a LA terminal of a connecting electric wire are fixed to the other screw portion of the bilateral bolt by tightening of the nut. Since the damaged bilateral bolt can easily be dismounted, even if the bilateral bolt is damaged, the matter thereof is can be settled by only the replace of the bilateral bolt.

8 Claims, 5 Drawing Sheets

SCREW TIGHTENING STRUCTURE

This application is a continuation of application Ser. No. 08/504,591 filed Jul. 20, 1995, now abandoned.

BACKGROUND OF THE INVENTION

1. Field of the Invention

This invention relates to improvements in Screw Tightening structure to tighten a bus bar and an end terminal of a connecting electric wire both of which constitute an internal circuit of a switch box.

2. Description of the Prior Art

Switch boxes such as a relay box or a fuse box have an internal circuit which is composed of a plurality of bus bars under normal conditions. End terminals of connecting electric wires for either electric supply or output are firmly tightened and fixed by screwing the bolts and the nuts on main bus bars.

FIGS. 4 and 5 show a conventional example of a screw tightening structure described above as disclosed in the Japanese Utility Model Application Laid Open No. 4-29165. Namely, a bolt 23 is fixed on one side of a case body 22 of a switch box 21 in such a way that the bolt 23 is integrally embedded in the case body 22 by insertion molding. Ends of a plurality of bus bars 24 and an end terminal (hereinafter called LA terminal) of the connecting electric wire 25 are fixed in such a manner that the ends and the LA terminal are securely tightened through a washer 27 by utilization of this stud bolt.

In the above both assembling and electric wiring for the switch box, the maker of the switch box has carried out the insertion molding of the bolt and distributing wires of the bus bars circuit, and the makers of automobiles have carried out the mounting of the LA terminal and tightening work of the nut, and as it did so, when the bolt is damaged because of excessive tightening of the nut, the only damaged portion can not be removed therefrom due to the insertion molding. For this reason, it must be substituted every wiring harness. Accordingly, this method resulted in the main cause of substantial cost.

SUMMARY OF THE INVENTION

In view of the foregoing, it is an object of the present invention to provide a screw tightening structure for a switch box, in which even if the bolt is damaged, it can easily be replaced. Consequently the waste that exchanging of the wiring harness must be performed about every damages is eliminated. Further, the depression of the manufacturing cost can be realized.

According to one aspect of the present invention, for achieving the above-mentioned objective, there is provided a screw tightening structure for switch box in which an end terminal of a connecting electric wire for either supply or output to a bus bar on an inside of a switch box is tightened securely and fixed by means both of a bolt and a nut, an embedded nut is provided for the switch box and there is a bilateral bolt providing screw portions for both sides of a head thereof, one side of the screw portions being screwed into the embedded nut, a bus bar and an end terminal of a connecting electric wire be fixed to the other screw portion of the bilateral bolt by tightening of the nut.

As stated above, the screw tightening structure for the switch box according to the invention is provided with the bilateral bolt screwed into the embedded nut, when the embedded nut is screwed securely on the exterior screw portion of the bilateral bolt the interior screw portion of which is screwed into the embedded nut with high torque, the interior screw portion of the bilateral bolt becomes double tightening, since the bus bar, LA terminal and so on are in existence outwardly, outer damage of the screw is frequent because stress concentrates the exterior screw portion over the interior thereof. In that case, the damaged bilateral bolt can easily be dismounted because the head thereof remains in. Even if the bilateral bolt is damaged, the matter thereof is can be settled by only the replace of the bilateral bolt.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Figure 1:
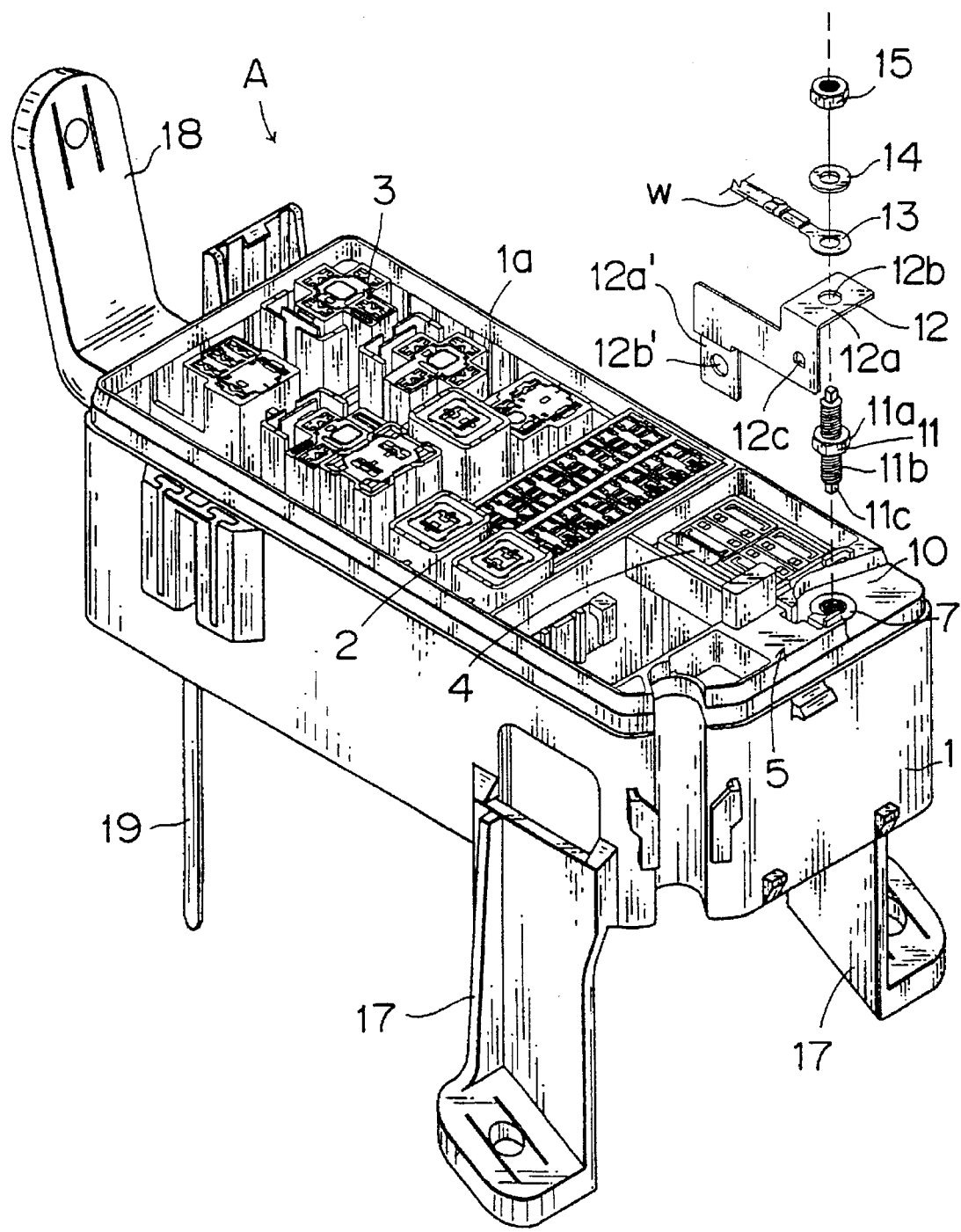
FIG. 1 is an exploded perspective view showing a switch box according to one embodiment of the present invention.
Figure 2:
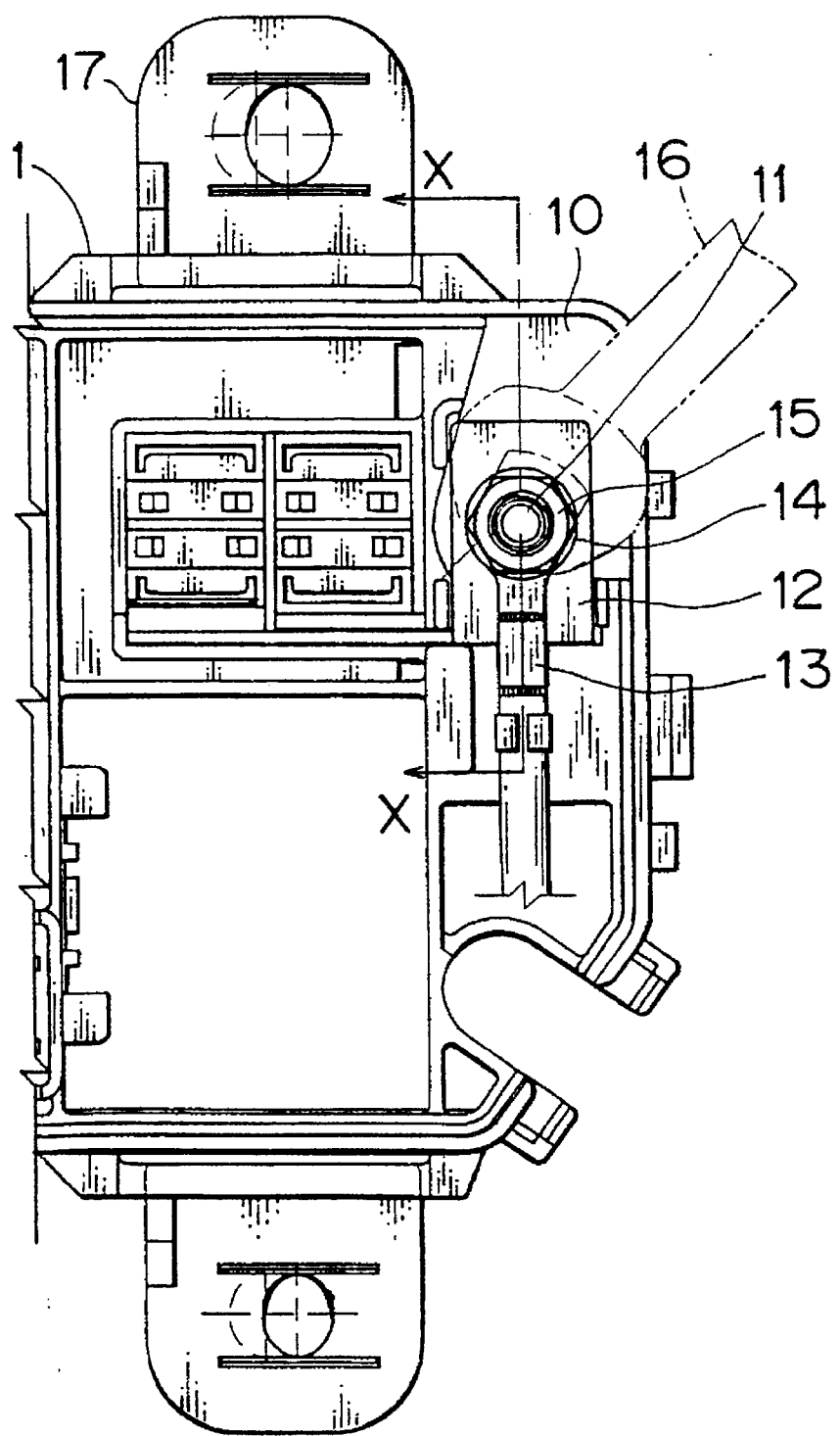
FIG. 2 is a plan view showing a portion of screw tightening structure of FIG. 1.
Figure 3:
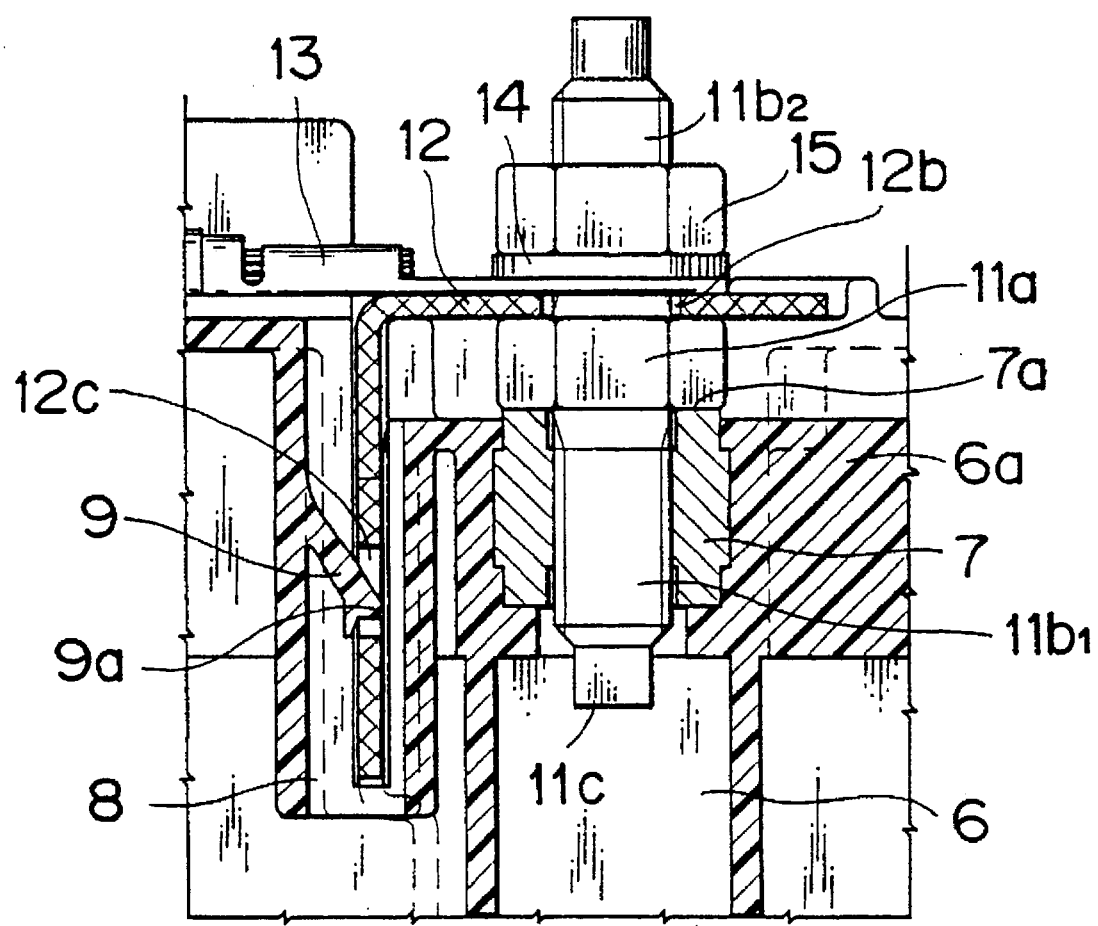
FIG. 3 is a grossly enlarged sectional view showing a cross section taken along the line X—X in FIG. 2.
Figure 4:
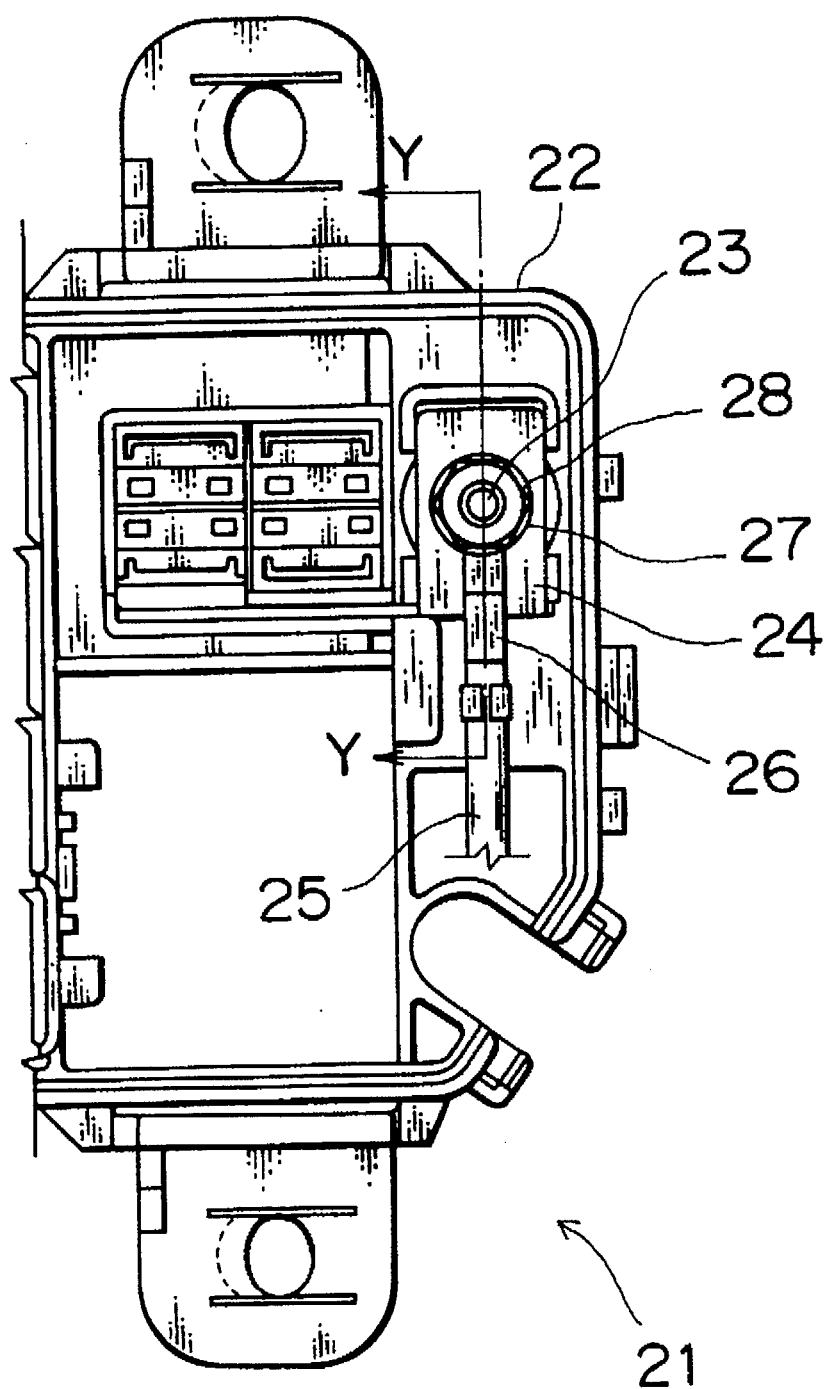
FIG. 4 is a plan view showing a conventional screw tightening structure for a switch box.
Figure 5:
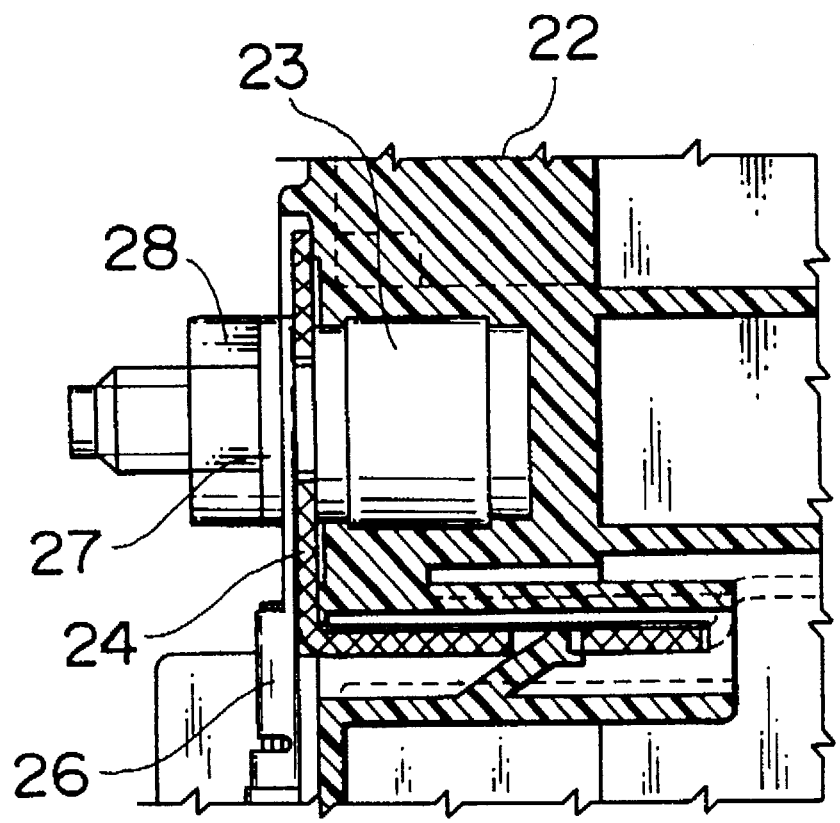
FIG. 5 is a sectional view showing a cross section taken along the line Y—Y in FIG. 4.

FIG. 1 is an exploded perspective view showing a switch box according to one embodiment of the present invention. FIG. 2 is a plan view showing a portion of screw tightening structure of FIG. 1. FIG. 3 is a grossly enlarged sectional view showing a cross section taken along the line X—X in FIG. 2.

In these drawings, an example in which a switch box A is formed as a relay box or a fuse box is shown. A plurality of cavities 2 for fuses together with a cavity 3 for a relay are provided for on one side of a main case 1 which is made up of synthetic resin insulating material. On the other side of the main case 1, a cavity 4 for fusible link (high-amperage current capacity fuse) together with a screw tightening portion 5 are formed separately in section by section.

The screw tightening portion 5 comprises a screw room 6 into which the nut 7 is mounted, and a bus bar engaging room 8 adjacent thereto. There are openings at the top and the bottom portions of the screw room 6. The nut 7 is fixed on a ceiling wall 6a of the upper part of the screw room 6 in such a way that the nut 7 is integrally embedded in the ceiling wall 6a by insertion molding. It is desirable that an upper end 7a of the nut 7 is the same surface of an upper surface of the ceiling wall 6a or that the upper end 7a of the nut 7 is slightly protruded from the upper surface of the ceiling wall 6a as illustrated in the drawing. A notch 10 is provided for a flange wall 1a of the main case 1 to be in the neighborhood of the upper end 7a of this nut 7 to set a tool such as a wrench 16 which is said later. A flexible arm 9 which has an engaging projection 9a from one side of the inside wall of the bus bar engaging room 8 is provided downward.

A bilateral bolt 11 which is screwed into the nut 7 has screw portions 11b (when distinguishing inside and outside, these are 11b1 and 11b2) putting the head 11a therebetween. The both sides of said bilateral bolt 11 are formed with a vertical symmetry. It is desirable that the external shape of the head 11a is hexagon shape which is the same as the ordinary bolt, and the pointed end portion 11c of the screw portion 11b is square pillar with thin diameter.

In the bus bar 12, as shown in the example of the drawing, the first L-shape crooked connecting piece 12a which has a bolt hole 12b on the upper portion of one end thereof is continuously formed. The second connecting piece 12a' which has a bolt hole 12b' on the lower portion of the other end thereof is continuously formed. Further an engaging hole 12c is provided for the one end thereof. Besides, in FIG. 1, reference numeral 17 denotes a fixing leg for fixing the switch box A on the body of the car, reference numeral 18 denotes a fixing arm for the same as the fixing leg 17, and reference numeral 19 denotes a belt for fixing the electric wire.

Next, fixing of both the bus bar 12 and the LA terminal 13 in accordance with the bilateral bolt 11 and the nut 7 will be explained.

In the first place, the screw portion 11b1 which is the one side screw portion of the bilateral bolt 11 is screwed and fixed into the nut 7 in the screw tightening portion 5 so as to touch the under surface of the head 11a to upper end 7a of the nut 7.

In the second place, the bus bar 12 is set to the other screw portion 11b2.

Namely, the bolt hole 12b of the first connecting piece 12a of the bus bar 12 is passed through the other screw portion 11b2, while retaining the condition, the first connecting piece 12a is brought down. This would result in that the one end side of the bus bar 12 enters into the bus bar engaging room 8. The other end side of the bus bar 12 enters into the cavity for the fusible link 4, as it did so, the engaging projection 9a of the flexible arm 9 is engaged with the engaging hole 12c of the bus bar 12, after latching for a time, the second connecting piece 12a' at the other end side is fixed by means both of the connecting terminal of the fusible link (not illustrated) and the bolt hole 12b' by using bolt.

Next, both of the LA terminal 13 of the termination of the electric connecting wire W and the washer 14 are passed through the screw portion 11b2 from above the first connecting piece 12a of the bus bar 12, and then the nut is fitted thereon, the nut 15 is tightened securely and fixed by means of the tool such as the torque wrench which is not illustrated.

On the occasion of taking the bus bar 12 and LA terminal and so on off by loosening the nut 15, the revolution of the bilateral bolt 11 itself is prevented in such a way that the head 11a of the bilateral bolt 11 is fixed by setting a tool such as the wrench 16 by utilization of the notch 10 of the main case 1.

In case where the nut 15 is tightened securely by means of the torque wrench, the interior screw portion 11b1 of the bilateral bolt 11 which is screwed into the embedded nut 7 becomes double tightening. However, for all practical purposes, the bus bar 12, LA terminal 13 together with the head 11a are in existence outwardly. Accordingly, outer damage of the screw is frequent because stress concentrates the exterior screw portion 11b2 over the interior thereof. In that case, the damaged bilateral bolt 11 can easily be dismounted because the head 11a thereof remains in. If the exterior screw portion 11b2 or the head 11a might be damaged, the remaining screw portion 11b1 can be removed by the way that the tool which is inserted from the lower opening end of the screw room 6, operates on the square pillar shape pointed end portion 11c.

For this reason, even if the bilateral bolt 11 is damaged, the matter thereof is can be settled by only the replace of the bilateral bolt 11. It can be eliminated waste that the switch box as a whole is replaced, in the conventional method.

As described above, according to the present invention there is provided a screw tightening structure for switch box in which the end terminal of the connecting electric wire for supply or output to the bus bar on the inside of the switch box is tightened securely and fixed by means both of the bolt and the nut. The embedded nut is provided for the switch box. One side screw portion of the bilateral bolt providing the screw portions for the both side of the head is screwed into the embedded nut. The bus bar and the end terminal of the connecting electric wire are fixed to the other screw portion by tightening of the nut. Even if the outside screw portion of the bilateral bolt is damaged, the inside screw portion can be taken out by the remaining head. The matter thereof caused by the damage is can be settled by only the replace of the bilateral bolt. The waste can be eliminated by the fact that it is not necessary to replace the switch box as a whole in the conventional method.

What is claimed is:

1. A switch box and screw tightening structure comprising
   a screw room;
   a connecting electric wire means for supply or output to a bus bar on an inside of said switch box, said connecting electric wire means having an end terminal which is tightened securely and freed to said bus bar;
   a bilateral bolt having a pair of screw portions each ending in a pointed end portion, wherein a first screw portion is on a first side of a head of said bilateral bolt and a second screw portion is on a second opposing side of said head of said bilateral bolt and said first screw portion is screwed into an embedded nut so that one said pointed end portion projects into said screw room and said second screw portion mates with a nut to fix said end terminal of a connecting electric wire to said bus bar; and
   said embedded nut provided in a notched surface of said switch box, said notched surface for allowing easy access of a wrench to said head of said bilateral bolt.

2. The switch box and screw tightening structure according to claim 1 wherein an upper end of said embedded nut is either flush with an upper surface of a ceiling wail of said screw room or said upper end of said embedded nut is slightly protruded from said upper surface of said ceiling wall of said screw room.

3. The switch box and screw tightening structure according to claim 1 wherein said notched surface is provided in a flange wall of a main case of said switch box to be near said upper end of said embedded nut.

4. The switch box and screw tightening structure according to claim 1 wherein both sides of a head of said bilateral bolt are formed with a vertical symmetry.

5. The switch box and screw tightening structure according to claim 4 wherein an external shape of said head is hexagonal.

6. The switch box and screw tightening structure according to claim 4 wherein pointed end portions of said screw portions of said bilateral bolt are square pillars which extend from a thin diameter of said screw portion.

7. The switch box and screw tightening structure according to claim 1 wherein both sides of said head of said bilateral bolt are formed with a vertical symmetry.

8. The switch box and screw tightening structure according to claim 7 wherein said pointed end portions of said screw portions of said bilateral bolt are square pillars which extend from a thin diameter of said screw portion.

* * * * *